Sept. 20, 1971   D. J. SQUIERS   3,605,876

ELECTROTHERMAL TIME PROPORTIONING TEMPERATURE CONTROL

Filed Sept. 4, 1969

David J. Squiers
Inventor

United States Patent Office 3,605,876
Patented Sept. 20, 1971

3,605,876
ELECTROTHERMAL TIME PROPORTIONING TEMPERATURE CONTROL
David J. Squiers, Attleboro Falls, Mass., assignor to Texas Instruments Incorporated, Dallas, Tex.
Filed Sept. 4, 1969, Ser. No. 855,179
Int. Cl. F25b 29/00
U.S. Cl. 165—12                                                7 Claims

ABSTRACT OF THE DISCLOSURE

Apparatus controls a furnace or other heat transfer means to maintain the temperature in a given zone substantially at a preselected level where the zone is subject to exchange of heat with respect to an environment at a variable rate tending to cause substantial change in temperature therein from this preselected level. An SCR is connected for energizing the furnace when the SCR is triggered. First and second thermistors are provided, the first sensing the temperature in the zone and the temperature of the second being substantially independent of the temperature in the zone. A heater is provided which is energized concomitantly with energization of the furnace to cause heating of the second thermistor. A triggering circuit for the SCR is interconnected with the thermistors and triggers the SCR to repetitively energize and deenergize the furnace for respective first and second time intervals varying as a function of the temperature in the zone, the average ratio of the first interval to the total cycle time (the sum of the first and second intervals) being proportional to the heat exchange rate.

---

This invention relates to temperature control apparatus and more particularly to such apparatus which will maintain the temperature in a given zone at a preselected level by proportional control of a furnace or other heat transfer means.

In typical known residential heating systems wherein the generation of heat is controlled in an "on-off" mode by a thermostat responding to the temperature in the central location in the dwelling, the thermostat typically provides a differential between the temperature which the furnace is turned on and that which it is turned off, which together with the delay between the time at which the furnace is energized and the time at which heat produced by that energization reaches the thermostat, causes a continual hunting or substantial variation of the actual temperature in the zone around the desired set point, the separation between the high and low temperatures being on the order of several degrees. In order to overcome this disadvantageous temperature variation, a type of control has been proposed which will maintain the temperature in the given zone quite precisely by so-called proportional control of the heat flow which is provided to the zone, that is, one which repetitively energizes and deenergizes the furnace or other heat transfer means at a rate which is relatively rapid with respect to the rate at which the temperature in the zone tends to change, the proportion of the furnace "on" to "off" time being continuously adjusted to supply heat to the zone at a rate which just offsets or balances the rate of heat loss, thereby more closely regulating the temperature in the zone than can be done with conventional on-off operation of a furnace.

A problem attendant with these proportioning controls of the prior art is that they generally have not been readily adaptable to being used with different types and sizes of furnaces. For example, in one type of proportioning control, temerature sensing means is physically positioned within the plenum of the furnace. Thus, a furnace with a plenum is required and operation of the control is necessarily dependent upon the specific thermal considerations pertaining to the furnace. The control must therefore be tailored to a particular size of furnace. In another type of control a thermistor is employed to determine the recycling rate, i.e., the rate at which the furnace is energized and deenergized, the thermistor being utilized in a self-heating mode for this purpose. A serious disadvantage in the latter arrangement is that the recycling rate is mainly dependent upon the thermal mass of the thermistor and the recycling rate can thus be effectively changed only by substituting a thermistor with a different thermal mass. Such adjustment is inconvenient. The control is not, therefore, conveniently adaptable for use with a wide range of types or sizes of furnaces which may require different cycling rates.

Prior art proportioning-type controls generally have also been disadvantageous in not being suitable for controlling temperature for both heating and cooling modes of operation, as is frequently desired in residential combined heating and cooling systems. This has necessitated separate controls for the furnace and the air conditioner.

Another disadvantage of prior art proportioning controls has been that they are usually quite complex and are therefore expensive to manufacture.

Accordingly, among the several objects of the invention may be noted the provision of apparatus for maintaining the temperature in a given zone quite precisely at a preselected level without substantial deviations around that level; the provision of such apparatus which provides for proportional control of the transfer of heat with repsect to the given zone to maintain the temperature therein substantially at the preselected level; the provision of such apparatus which requires only electrical interconnection with a furnace or other heat transfer means, thereby obviating physical interconnection therewith; the provision of such apparatus which readily facilitates adjustment of the recycling rate at which the apparatus is repetitively deenergized; the proivsion of such apparatus which is readily applicable to various types and sizes of furnaces or other heat transfer means; the provision of such apparatus which can be used for controlling the temperature in a given zone in both heating and cooling modes of operation; the provision of such apparatus whose operation is relatively immune to variations in supply voltage and ambient temperatures; the provision of such apparatus which is highly reliable, relatively simple and inexpensive. Other objects and features will be in part apparent and in part pointed out hereinafter.

Briefly, apparatus according to this invention is operative to maintain the temperature in a given zone at a preselected level, the zone being subject to exchange of heat at a variable rate with respect to an environment outside the zone so as to cause the temperature in the zone to tend to change from the preselected temperature level. The apparatus includes means (such as a furnace) which, when energized, causes transfer of heat with respect to the zone in a sense tending to return the temperature therein to the preselected level. A semiconductor current-switching device is provided and, when triggered, becomes conductive for energizing the heat transfer means. Temperature sensing means, preferably a thermistor, is responsive to the temperature in the zone. Another thermistor is provided whose temperature is substantially independent of the temperature in the zone. The apparatus includes a heater for heating the latter thermistor and includes means for energizing the heater concomitantly with the heat transfer means. A triggering circuit for the switching device is interconnected with the sensing means and the second thermistor for repetitively triggering the switching device and thus energizing and deenergizing the heat transfer means for respective first and second time intervals which are a function of the temperature in the zone, the average ratio of the first of these intervals to the total cycle time (the sum of the first and second time intervals) being proportional to the variable heat exchange rate, thus causing the temperature in the zone to be maintained substantially at the pre-selected level.

In the accompanying drawings, in which are illustrated two of various possible embodiments of the invention, FIG. 1 is a diagrammatic illustration of a heating system provided with temperature control apparatus according to the present invention;

Corresponding reference characters indicate corresponding parts throughout the several views of the drawings.

Figure 1:
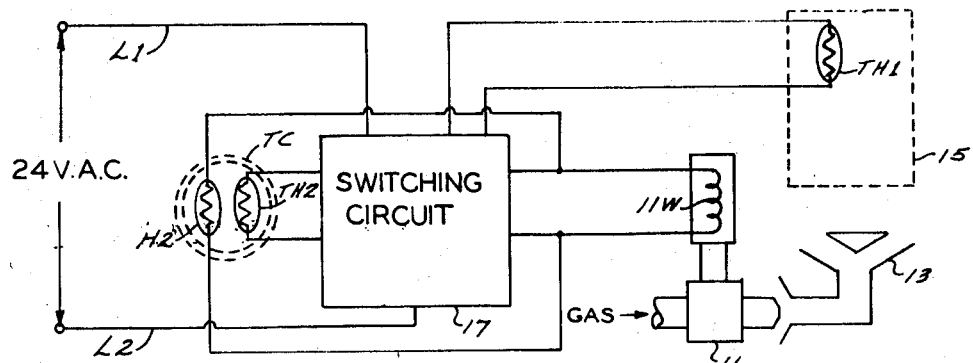

Referring now to FIG. 1, there is illustrated in diagrammatic form a heating system including temperature control apparatus according to the present invention. The apparatus controls a solenoid-operated gas valve 11 by energization of its solenoid operating winding 11W to supply fuel to a gas burner 13 such as utilized, for example, for firing a forced hot-air furnace employed as a conventional residential heating unit. Such a furnace may include a heat exchanger and a plenum for transferring heat in conventional manner to a zone 15 such as the living area of a residence. Apparatus according to the present invention is adapted to maintain the temperature in zone 15 at a preselected level. While only a gas burner is shown in FIG. 1, it should be appreciated that apparatus according to the present invention is also adapted to control an air conditioner or other cooling means.

Whenever the temperature outside zone 15 is different from the temperature therein, the zone will be subject to an exchange of heat with respect to this outside environment at a rate variable in accordance with the temperature differential. If the outside temperature is different from the preselected level to be maintained in the zone, this exchange of heat tends to cause change in the zone temperature from the preselected level. For example, if the outside temperature is cooler than the preselected level, heat will be lost from zone 15 which, in the absence of any heating by the furnace, will cause a drop in the temperature in zone 15 from the preselected level.

Positioned in zone 15 is a thermistor TH1 constituting temperature sensing means which is responsive to the temperature in zone 15. Thermistor TH1 exhibits a positive temperature coefficient (PTC) of resistivity. Apparatus of the invention is provided with a second thermistor TH2 having a negative temperature coefficient (NTC) of resistivity and which is positioned outside zone 15, e.g., in the basement of the residence. Thermally coupled to thermistor TH2 to provide means for heating the latter is a PTC thermistor H2 which is connected in a circuit across gas valve winding 11W so that it will be energized concurrently with energization of winding 11W (and thus concomitantly with operation of the furnace). When so energized, thermistor H2 self-heats, causing heating of thermistor TH2. Thermistor H2 is preferably of the type of PTC thermistor having a transition temperature above which its resistance rises relatively abruptly and thus is self-regulating when energized, its temperature being maintained relatively precisely substantially at the transition temperature. Thermistors TH2 and H2 may be small thermistor "pills" of appropriate thermistor material which are placed in adjacent relationship and then surrounded by or potted in a material such as epoxy so that a suitable thermal relationship will exist between the thermistors inter se and between the environment and the thermistors. Thus the combination of thermistors TH2 and H2 may be quite small.

It should be here understood that it is desired that the medium which surrounds thermistors TH2 and H2 exhibit a degree of thermal conductivity with respect to the environment surrounding them since, in the absence of such conductivity, heating of thermistor H2 would cause the temperature of thermistors TH2 and H2 to become progressively higher. On the other hand, it is required that the temperature of thermistor TH2 be substantially independent of short term variations in the temperature in zone 15 as noted previously. In this sense, the temperature of thermistor TH2 will be substantially independent of the temperature in zone 15. In conventional residential heating systems, thermistors TH2 and H2 (and the remainder of the circuitry of the apparatus) may be located in the basement of the residence or may even be located in zone 15 (as in a residence having no basement). In either case, variations in the temperature in zone 15 will have an effect on the temperature in that environment surrounding thermistors TH2 and H2. However, these thermistors will not respond to short term variations in the temperature in this surrounding environment. The thermal coupling between thermistors TH2 and H2 and the thermal relationship between them and the environment which surrounds them are indicated by the double dashed lines designated TC.

Figure 2:
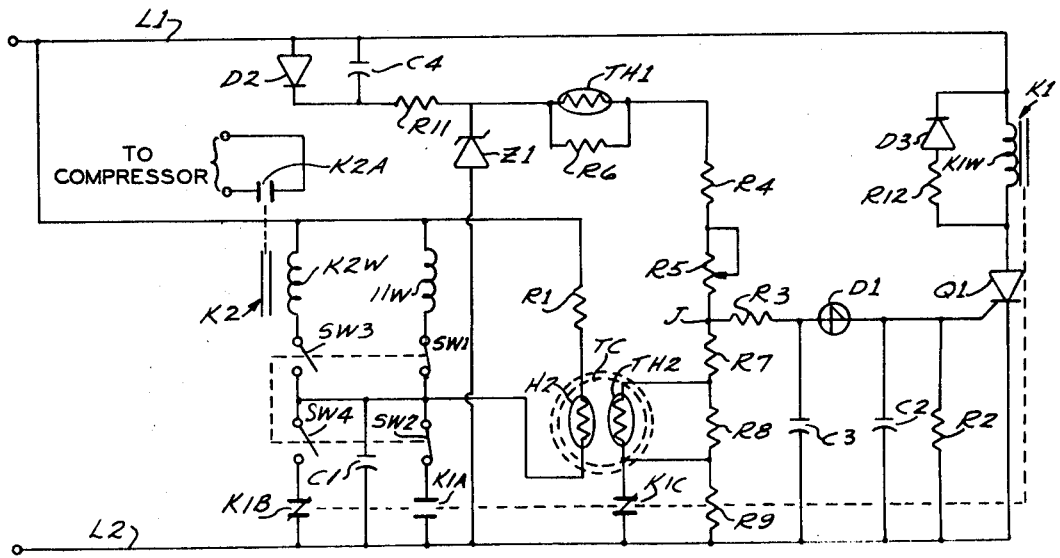
FIG. 2 is a schematic circuit diagram of the temperature control apparatus.
Figure 3:
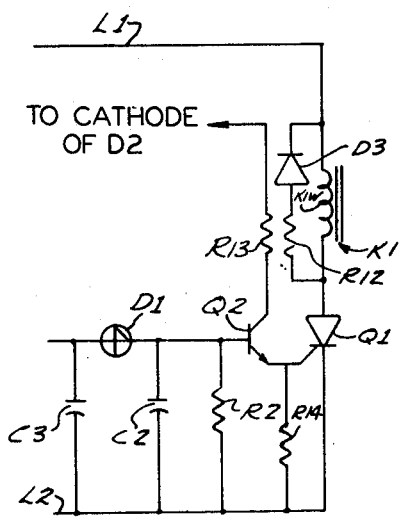
FIG. 3 is a schematic circuit diagram of another embodiment of the apparatus.

Indicated generally at 17 is a switching circuit which constitutes means for controlling gas valve operating winding 11W. The details of this circuit are shown in FIGS. 2 and 3. This circuit is interconnected with thermistors TH1 and TH2 and is operative, as is explained hereinafter, to repetitively energize and deenergize winding 11W in response to the relative resistances of thermistors TH1 and TH2, thereby to maintain the temperature in zone 15 at a preselected level. A.C. power of a suitable voltage, e.g., 24 v. A.C., is provided to switching circuit 17 by means of a pair of leads L1 and L2.

A preferred embodiment of the apparatus according to the present invention is schematically illustrated by means of the circuit diagram of FIG. 2. Operating winding 11W of gas valve 11 is shown connected in a circuit across leads L1 and L2. This circuit includes a pair of switches SW1 and SW2 and the normally open contacts K1A of a realy K1. The winding K1W of relay K1 is series-connected in a circuit with the anode and cathode terminals of a silicon controlled rectifier (SCR) Q1 across leads L1 and L2. Other types of semiconductor current-switching devices may instead be employed in place of this SCR. Switches SW1 and SW2 are closed when the apparatus is to be used in a heating mode to control the temperature in zone 15. When it is desired that the apparatus be used in a cooling mode, a second pair of switches SW3 and SW4 are closed and switches SW1 and SW2 are opened (switches SW1-SW4 being interconnected as indicated for this purpose) to complete a circuit across leads L1 and L2 which includes the winding K2W of a relay K2 and the normally closed contacts K1B of relay K1. A pair of normally open contacts K2A of relay K2 are connected in a circuit with an air conditioning compressor or equivalent cooling means for energization thereof upon closing of these contacts. Thermistor H2 is connected in a circuit across winding 11W through a current-limiting resistor R1. An arc suppression capacitor C1 is connected across either of contacts K1A or K1B, depending upon which one of switches SW2 and SW4 is closed.

A circuit for triggering SCR Q1 includes a capacitor C2 and resistor R2 interconnecting the gate and cathode terminals of the SCR. The triggering circuit further includes a silicon unilateral switch or snap-action diode D1 which causes triggering of the SCR when the voltage applied across unilateral switch D1 reaches the avalanche potential thereof, e.g., about 8 volts. When this potential is exceeded, the voltage across unilateral switch D1 drops with a snap action to a rather low potential and the resultant current through resistor R2 causes a triggering potential to be applied to the gate terminal of the SCR. A transient or RF suppression circuit is provided by means of a resistor R3 and capacitor C3, the latter shunting transients or RF interference to lead L2 in order to prevent them from causing unintended triggering of the SCR.

Thermistors TH1 and TH2 are each connected in a respective leg of a voltage divider. The upper leg of the voltage divider includes, in series, the parallel combination of thermistor TH1 and a resistor R6, a resistor R4, and a rheostat R5. Resistor R6 is employed for the purpose of obtaining a suitable resistivity characteristic or "slope" for thermistor TH1. The lower leg of the voltage divider includes, in series, a resistor R7, the parallel combination of thermistor TH2 and a slope-adjusting resistor R8, and a differential resistor R9. The voltage divider includes a junction J between rheostat R5 and resistor R7. The potential at this junction is a function of the resistances of both thermistors TH1 and TH2. Normally closed contacts K1C of relay K1 are connected across differential resistor R9 to obtain a voltage differential at junction J when these contacts are opened or closed. D.C. voltage is supplied to the voltage divider by means of a diode D2 and resistor R11 which interconnect thermistor TH1 and lead L1. This voltage is regulated by a Zener diode Z1 connected from the junction of resistor R11 and thermistor TH1 to lead L2. A capacitor C4 is connected across diode D2 to cause a shift in the phase of the D.C. voltage supplied to the triggering current so that the SCR will be triggered over a greater portion of the A.C. waveform applied across its anode and cathode terminals. Whenever SCR Q1 is conductive, chattering of the contacts of relay K1 are prevented by a diode D3 and resistor R12 series-connected across its winding K1W.

In the operation of the apparatus, it is assumed that switches SW1–SW4 are in the position shown in FIG. 2 so that the apparatus will operate in a heating mode. A supply voltage suitable for semiconductor circuitry, 24 v. A.C., is applied across leads L1 and L2. Rheostat R5 is adjusted to determine the "set point" or preselected level at which it is desired to maintain the temperature in zone 15, as sensed by thermistor TH1. If because of the leakage of heat with respect to the environment outside zone 15, the temperature therein falls below this preselected level, the D.C. voltage at junction J will rise above a threshold value which will cause breakdown of unilateral switch D1 and thereby cause triggering of SCR Q1. Such triggering energizes relay winding K1W, thereby closing contacts K1A and opening contacts K1C. Closing of contacts K1A energizes the operating winding 11W of the gas valve solenoid and the gas burner will be turned on thereby delivering heat to zone 15. The opening of contacts K1C adds the resistance constituted by resistor R9 to the lower leg of the voltage divider and thus raises the potential at junction J by a voltage differential. This differential may be of the order of the equivalent of 1.5° F. change in the temperature of thermistor TH1. Since thermistor H2 is connected across winding 11W, it is energized concomitantly with this winding and thereby supplies heat to thermistor TH2. Because of its negative resistance characteristic, the resistance of thermistor TH2 is decreased exponentially and lowers the voltage at junction J accordingly. When this voltage is reduced by the amount of the differential added by resistor R9, triggering of SCR Q1 ceases, thereby closing gas valve 11 and terminating the delivery of heat to zone 15. The amount of heat delivered in this first short time interval during which the furnace is operative (which may vary from a few seconds to a few minutes or more) is insufficient to cause any substantial increase in the temperature in zone 15, but rather is just sufficient to offset the amount of heat lost from zone 15 to the outside environment.

When triggering of SCR Q1 ceases as described above, contacts K1A are once more opened and contacts K1C are closed. Thus winding 11W is deenergized, terminating the transfer of heat to zone 15 by the furnace. The closing of contacts K1C once more shunts resistor R9 and thus the potential at junction J is reduced by the differential represented by the voltage drop across resistor R9. In the absence of heating by thermistor H2, thermistor TH2 cools down and its resistance thereby increases. After a variable second time interval, its resistance is sufficiently increased to cause the junction J to reach the breakdown potential of the unilateral switch D1. At this point, triggering of SCR Q1 once more takes place and the gas valve is reopened to supply heat to zone 15. Both the first time interval, during which triggering of SCR Q1 takes place, and the second time interval, during which thermistor TH2 cools in order to permit retriggering of the SCR, depend upon the resistance of thermistor TH1, this resistance varying according to the temperature in zone 15. Thus both the first and second time intervals are a function of the temperature in the zone. The average ratio of the first of these intervals to the total cycle time is proportional to the rate at which heat is lost from zone 15.

From the foregoing it may be seen that triggering of SCR Q1 takes place and the furnace is thus energized in response to resistive variation by thermistor TH1 upon deviation in the temperature in the zone from the preselected level determined by the setting of rheostat R5. Energization of the furnace causes concomitant energization of thermistor H2 which thereby heats thermistor TH2, causing triggering of SCR Q1 to cease. Thus it may be seen that the furnace is deenergized in response to resistive variation by thermistor TH2 upon the heating thereof. It should be understood that the frequency of the periodic energization of burner 13 is typically many times greater than the frequency at which furnaces are normally energized by conventional thermostats and thus the temperature in zone 15 does not vary substantially from the preselected level.

As the rate of loss of heat from zone 15 to the outside environment becomes greater, the temperature in zone 15 is actually slightly reduced or caused to "droop" from the desired set point determined by the setting of rheostat R5. This slight variation in temperature, which may be of the order of 0.5° F., determines a relatively narrow proportioning band of temperatures which includes the preselected level in the zone and it is the actual temperature in zone 15 within this narrow band of proportioning temperatures, as sensed by thermistor TH1, which determines the ratio of the "on" to "off" intervals of the furnace. Since the variation may be a maximum of 0.5° F., for example, no temperature in the proportioning band varies substantially from the preselected level. If the rate of heat loss from zone 15 is low, the "off" time for the furnace is relatively long and the "on" time relatively short. Accordingly, only a small part of the furnace capacity is utilized. However, as the rate of heat loss becomes large, the "off" time is short and the "on" time is long. A major part of the furnace capacity is thus required to just offset the loss. If the loss becomes greater than furnace capacity, the furnace will be continuously energized. Conversely, if the temperature in zone 15 does not drop below a point causing triggering of SCR Q1, the furnace will remain continuously deenergized.

The recycling rate for any set of conditions may be changed, e.g., by changing resistor R9 (which may, for this purpose, be a rheostat), by similarly changing resistor R1 and thus varying the level of energization of thermistor H2, or by changing either the thermal coupling between thermistors TH2 and H2 or the mass of TH2. Thus the recycling rate is quite easily changed to accommodate a particular type or size of furnace or installation.

If it is desired to employ the apparatus in a cooling mode of operation, switches SW3 and SW4 are closed and switches SW1 and SW2 opened. It should be understood that generally it is desired that the apparatus not operate in a proportioning mode of operation when employed to control an air conditioner since it is usually preferred that the compressor cycle for relatively long periods, rather than the short periods which would be typical of a proportioning mode of operation. Such long cycling is desirable for compressors and also insures better dehumidification by the air conditioner. It is therefore desired that the apparatus revert to an "on-off" operation in the event that a cooling mode of operation is desired.

When the apparatus is thus employed, it is assumed that the temperature outside the zone 15 is higher than the temperature level it is desired to maintain therein, this level being determined by the setting of rheostat R5. It should be noted again that contacts K1B are normally closed when winding K1W is deenergized. Thus, in the absence of triggering of SCR Q1, relay winding K2W is energized because of the closed contacts K1B. This causes the closing of contacts K2A to complete the compressor circuit and thereby cause cooling in zone 15. Accordingly, as long as thermistor TH1 senses that the temperature in zone 15 is higher than the preselected level desired to be maintained therein, the potential at junction J will be less than that required to cause triggering of SCR Q1 and the compressor therefore remains in operation. However, as the temperature in zone 15 reaches the preselected level, triggering of SCR Q1 takes place. This energizes winding K1W, causing contacts K1B and K1C to open.

In this cooling mode of operation of the apparatus, thermistor H2 is connected across relay winding K2W (rather than gas valve operating winding 11W) and is thus energized concomitantly therewith. Thermistor H2 therefore causes heating of thermistor TH2 whenever winding K2W is energized. The reduced resistance of thermistor TH2 resulting from this heating drives the potential at junction J even farther below the level at which triggering of SCR Q1 may take place. Thus when the apparatus is in this cooling mode of operation, thermistor TH2 acts to increase the time of energization of winding K2W and thereby energization of the air conditioning compressor, rather than to decrease its time of operation, as would be the case in a heating mode of operation.

When contacts K1C are opened as described above, differential resistor R9 is included in the lower leg of the voltage divider and thus raises the potential at junction J providing the switching circuit with a differential representing preferably about 1.5° F. change in the temperature of thermistor TH1. When the temperature in zone 15 has increased by an amount sufficient to overcome this differential, triggering of SCR Q1 once more ceases and the resultant deenergization of winding K1W permits closing of contacts K1B, thereby energizing relay winding K2W. Accordingly, contacts K2A are closed to once more energize the compressor.

Although in most residential applications it is preferable to employ on-off operation of the control in a cooling mode, apparatus according to the present invention could also be made to operate in a proportional mode for cooling as by using a PTC thermistor in place of NTC thermistor TH2.

A second embodiment of the invention is illustrated in FIG. 2 and may be employed where SCR Q1 requires greater triggering current than in the embodiment of FIG. 2. In this second embodiment, an NPN transistor Q2 is utilized which has its base terminal connected to unilateral switch D1 and its emitter terminal connected to the gate or triggering terminal of SCR Q1. Its emitter is connected through a biasing resistor R13 to the cathode of diode D2 and its emitter is biased to ground through a resistor R14. Transistor Q2 acts as a buffer amplifier stage to provide greater triggering current to SCR Q1. Operation of the embodiment is substantially identical with that of FIG. 2.

The aparatus as thus described is relatively immune to variations in supply voltage and ambient temperatures. Since Zener diode Z1 controls the voltage supplied to the voltage divider circuit and thereby the triggering circuit for SCR Q1, variations in line voltage have little effect on the turn-on and turn-off points of the triggering circuit. And since this type of switching circuit has a definite "on" state and "off" state with little or no phasing between states, its ambient stability is dependent upon the unilateral switch D1 which controls triggering of SCR Q1. Such a unilateral switch exhibits a quite low temperature coefficient and thus variations in the ambient temperature have little effect on the apparatus. Further, since simple electrothermal devices and semiconductor components are employed, apparatus according to the present invention is highly reliable, relatively simple and inexpensive.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for maintaining the temperature in a given zone at a preselected level, said zone being subject to exchange of heat at a variable rate with respect to an environment outside the zone, said exchange tending to cause change in said temperature from said preselected level, said apparatus comprising:
    means which, when energized, causes transfer of heat with respect to the zone in a sense tending to return the temperature in the zone to said preselected level;
    a triggerable semiconductor current-switching device which, when triggered, becomes conductive for energizing the heat transfer means;
    temperature sensing means responsive to the temperature in the zone;
    a thermistor whose temperature is substantially independent of the temperature in the zone;
    a heater for heating said thermistor;
    means for energizing the heater concomitantly with the heat transfer means;
    a triggering circuit for said switching device interconnected with said sensing means and said thermistor for repetitively triggering said switching device to cause energization and deenerization of said heat transfer means for respective first and second time intervals which are a function of the temperature in the zone, a single first and second time interval comprising a plurality of alternating current cycles, the average ratio of one of said intervals to the sum of said intervals being proportional to the variable heat exchange rate, whereby the temperature in the zone is maintained substantially at said preselected level.

2. Apparatus as set forth in claim 1 wherein said temperature sensing means and said thermistor are interconnected in a sense to cause triggering of said switching device in response to resistive variation by said temperature sensing means upon deviation in the temperature in the zone from said preselected level and causing said triggering to cease in response to resistive variation by said thermistor upon heating thereof.

3. Apparatus as set forth in claim 2, said temperature sensing means comprising a further thermistor.

4. Apparatus as set forth in claim 3 wherein said heater for heating the first-said thermistor comprises another thermistor having a positive temperature coefficient and a transistion temperature above which the resistance thereof rises relatively abruptly.

5. Apparatus as set forth in claim 3, said thermistors being respectively connected in respective legs of a voltage divider and having opposite types of temperature coefficients of resistivity.

6. Apparatus as set forth in claim 5, the first-said thermistor having a negative temperature coefficient of resistivity, said further thermistor having a positive temperature coefficient of resistivity.

7. Apparatus as set forth in claim 1 wherein said heat transfer means comprises an electrically energizable fuel valve which is energized in response to triggering of said switching to supply fuel for heating said zone, said apparatus further comprising:
  electrically energizable means for cooling said zone; and
  selectable switching means for permitting said switching device to cause energization of the cooling means and for preventing energization of said fuel valve, said switching means preventing said ratio of said one of said intervals to the sum of said intervals from being proportional to the variable heat exchange rate when selected to permit energization of the cooling means.

References Cited
UNITED STATES PATENTS
3,211,214   10/1965   Chambers _____ 165—28

CHARLES SUKALO, Primary Examiner

U.S. Cl. X.R.

165—26